United States Patent
Tillman

[15] 3,661,175
[45] May 9, 1972

[54] CONTAMINATION RESISTANT FLUID FLOW FUSE

[72] Inventor: Alfred Tillman, Mount Tabor, N.J.
[73] Assignee: Marotta Scientific Controls, Inc., Booton, N.J.
[22] Filed: May 25, 1970
[21] Appl. No.: 40,297

[52] U.S. Cl. ..................... 137/517, 137/498, 137/513.3, 137/537
[51] Int. Cl. ........................................ F16k 17/34
[58] Field of Search .................. 137/460, 498, 517, 537

[56] References Cited

UNITED STATES PATENTS

| | | | |
|---|---|---|---|
| 547,506 | 10/1895 | Sleigh et al. | 137/517 X |
| 1,094,209 | 4/1914 | Huddleston | 137/517 |
| 3,331,389 | 7/1967 | Kirk | 137/517 X |
| 1,395,586 | 11/1921 | Krichbaum | 137/460 |
| 3,441,052 | 4/1969 | Schilling | 137/517 |
| 123,098 | 1/1872 | Goodale | 137/517 |
| 3,106,226 | 10/1963 | Machen | 137/517 X |

FOREIGN PATENTS OR APPLICATIONS

| | | | |
|---|---|---|---|
| 706,674 | 3/1954 | Great Britain | 137/517 |

*Primary Examiner*—Robert G. Nilson
*Attorney*—Sandoe, Hopgood and Calimafde

[57] ABSTRACT

This specification discloses a fluid flow fuse, including some modified constructions, with a valve element that moves between open and closed positions without the use of any close fitting guide for the valve element. The valve element is loose in the passage that it controls so that when the valve element remains continuously in open position for long periods of time, contamination deposits that accumulate in the passage (particularly in water passages) do not stick the valve element to a guide so that it can not operate when fluid flow in the passage reaches a velocity at which the fuse was originally designed to close. Abutments with which the valve element contacts when yieldably held in open position have line contact, or small areas of contact with the valve element, so that the valve element can not become firmly stuck to its limit stops.

12 Claims, 7 Drawing Figures

PATENTED MAY 9 1972　　3,661,175

INVENTOR
Alfred Tillman
BY Sandoe, Hopgood & Calimafde
ATTORNEYS.

3,661,175

CONTAMINATION RESISTANT FLUID FLOW FUSE

BACKGROUND AND SUMMARY OF THE INVENTION

Fluid flow fuses have valve elements that move into closed position to shut off or greatly reduce the rate of flow through a passage whenever the flow velocity exceeds a rate which is never intended to be attained during the intended use of the passage. Fluid flow fuses are commonly used to protect a fluid supply line from excessive discharge in the event of the bursting of a pipe or hose downstream from the fuse.

During normal use of the passage, fluid flows around the valve element of the fuse with a certain amount of pressure drop which increases as the rate of flow increases. Usually, the valve element is urged toward its open position by yielding means, such as a spring, and when the pressure drop of the fluid flow around the valve element exceeds the force of the spring, the valve element moves toward closed position. Sometimes the valve element of a fluid flow fuse remains in open position for long periods of time and deposits accumulate in the passage in such quantities that the valve element can not close when an occasion arises that causes the flow of the fluid to exceed the intended maximum. This accumulation may reduce the cross section of a guide, in which a part of the valve element is intended to slide, and thereby eliminate the clearance necessary for movement of the valve element. The accumulation may occur on the valve element and on a limit stop that holds the valve element at the open position end of its stroke. This accumulation may stick the valve element to the limit stop, and a fluid flow greatly in excess of the intended maximum may be required to develop enough pressure drop to pull the valve element loose.

The fluid flow fuse of this invention has a valve element that moves between open and closed positions without any close fitting guide. The construction is one that does not require accurate positioning of the valve element when at open position or during its travel toward closed position. The valve element is correlated with its seat so as to be self-aligning. This permits the use of loose fitting valve elements that are not affected by accumulations on the walls of the fluid passage.

When the valve element is biased toward open position by a spring, it is necessary to have a limit stop for determining the end of the stroke of the valve element toward open position. In order to prevent possible sticking of the valve element to its open limit stop, this invention uses stops that have only line contact with the valve element, or at most a minimum surface contact, so that if there is any sticking caused by deposits from the fluid, the bond will be of very small cross section and oriented to be subject to tension stress which breaks easily compared to bonds that are subject only to shearing stresses and where the thickness of section to be sheared is large even though the thickness of the deposit is small, as in the case of double-hung window sash stuck against sliding by hardened paint.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF THE PREFERRED EMBODIMENTS

Figure 1:
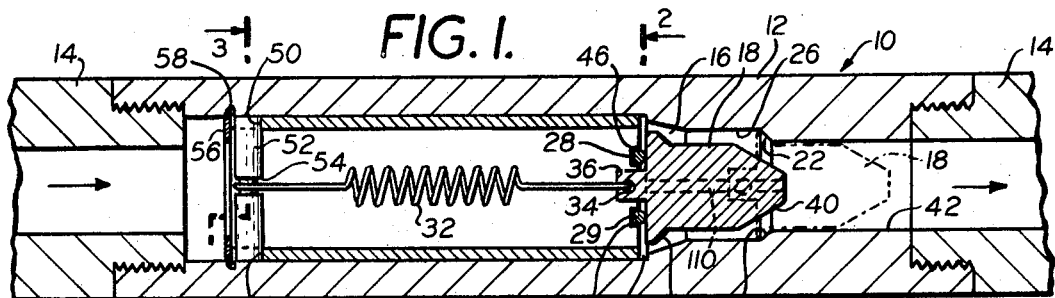
FIG. 1 is a sectional view showing a fluid flow fuse made in accordance with this invention and installed in a pipeline.
Figure 2:
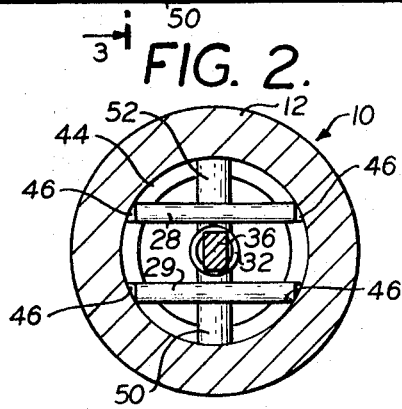
FIG. 2 is a sectional view taken on the line 2—2 of FIG. 1.
Figure 3:
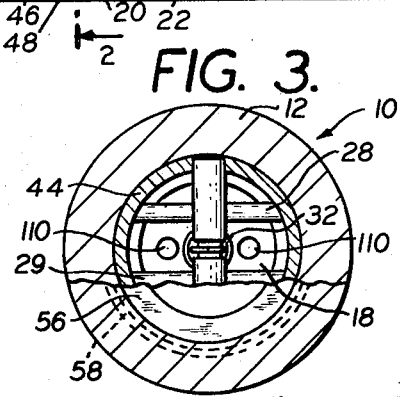
FIG. 3 is an offset sectional view taken on the line 3—3 of FIG. 1.

FIG. 1 shows a pipeline 10 including a housing 12 connected at opposite ends to piping 14. There is a fluid flow passage through the housing 12 and a part of this passage includes a valve chamber 16 in which a valve element 18 is located.

The valve element 18 has a frusto-conical face 20 that seats against a frusto-conical valve seat 22 formed by a shoulder in the fluid flow passage and having a taper substantially equal to that of the face 20 of the valve element 18.

A length 26 of the fluid flow passage, immediately upstream from the valve seat 22, has a diameter substantially larger than the corresponding diameter of the valve element 18 so that even though solid deposits build up on the wall of the fluid flow passage, the valve element 18 can still move freely along the length 26 of the passage to bring the face 20 of the valve element into contact with the valve seat 22.

FIG. 1 shows the valve element 18 in open position and when in open position the valve element 18 contacts with an abutment consisting of two rods 28 and 29. The valve element 18 is held against these abutment rods 28 and 29 by spring means consisting of a helical tension spring 32 which hooks through an opening 34 in an extending portion 36 of the valve element 18.

The extending portion 36, which is preferably of one-piece construction with the valve element 18, projects between the abutment rods 28 and 29 but with substantial clearance from the rods so that it does not touch the rods 28 and 29 even if the valve element 18 is considerably off center. The upstream surface of the valve element 18 has only line contact with the abutment rods 28 and 29 because of the round shape of the rods. Other shaped rods can be used but it is one feature of the invention that the contact of the rods 28 and 29 with the valve element 18 be a line contact or a surface contact of very small area so that in the event that the rods 28 and 29 and the valve element 18 become coated with solid deposits from the fluid in the passage, any accumulation holding the valve element to the rods 28 and 29 is of small cross section and easily broken loose by fluid pressure which tends to move the valve element 18 toward the right (in FIG. 1) away from the abutment rods 28 and 29.

The valve element 18 is shown in dotted lines in its closed position. A tapered face 40 of the valve element 18 extends into a reduced diameter portion 42 of the fluid flow passage. The maximum cross section of the part of the valve element 18 that moves into the reduced diameter portion 42 of the fluid passage is slightly less than the diameter of the portion 42 of the passage.

The tapered portion 40 of the valve element 18 co-operates with the passage 42 beyond the valve seat to exert a dash pot action which damps any vibration of the valve element which may be set up by flow of fluid around the valve element 18.

The passage length 26 flares outwardly toward its upstream end at the region adjacent to the face 20 of the valve element so that the clearance around the valve element 18 becomes less as the valve element 18 begins to move toward closed position. This reduced area for fluid increases the pressure drop around the valve element 18 and causes it to continue to move toward closed position even though the force of the spring 32 increases as the valve element moves toward closed position.

The abutment rods 28 and 29 are held in position by a sleeve 44 which fits into the housing 12 and which forms a part of the passage through the housing. This sleeve 44 slides into the housing from the upstream end with a sliding fit and there are notches 46 in the end face of the sleeve 44 for receiving the ends of the rods 28 and 29. The rods 28 and 29, when located in the notches 46, extend across the cross section of the passage in the housing 12 into which the sleeve 44 fits and the rods are held against a shoulder 48 of the housing 12 by the sleeve 44.

At the upstream end of the sleeve 44 there are notches 50 which receive an upstream rod 52 extending across a diameter of the fluid flow passage. The upstream rod 52 is of a length substantially equal to the outside diameter of the sleeve 44 so that it can not move longitudinally out of the notches 50. There is a circumferential groove 54 mid way between the ends of the rod 52. One end of the spring 32 hooks into the groove 54 and the sides of the groove hold the upstream end of the spring 32 substantially centered in the fluid passage. A snap ring 56 fits into a groove 58 in the wall of the passage through the housing 12; and this snap ring 56 holds the sleeve 44 against end-wise movement and keeps the rods 28 and 29 from moving away from the shoulder 48.

From the description thus far it is apparent that the valve element 18 is not closely confined transversely in the fluid flow passage. It has no guide means in which any portion of the valve element fits with a sliding fit. It can be said that the valve element 18 is loose in the fluid flow passage, and the operation of the fluid flow fuse is not affected, to any consequential degree, by shifting of the valve element 18 off center. Fluid flow around the valve element produces substantially the same pressure drop whether there is more clearance on one side than on the other or whether the clearance is substantially uniform around the circumference of the valve element, since the increase in clearance on one side produces a corresponding decrease on the other.

The spring 32 hooks through the opening 34 with a substantial clearance so that the valve element 18 has a degree of freedom of movement on its hooked connection with the spring for shifting of the valve as it strikes against the side wall during its movement between open and closed positions; but the pull of the spring 32 is substantially along the center axis of the fluid flow passage so that the spring operating against the end of a circular opening 34 does exert a centering influence on the valve element 18.

Figure 4:
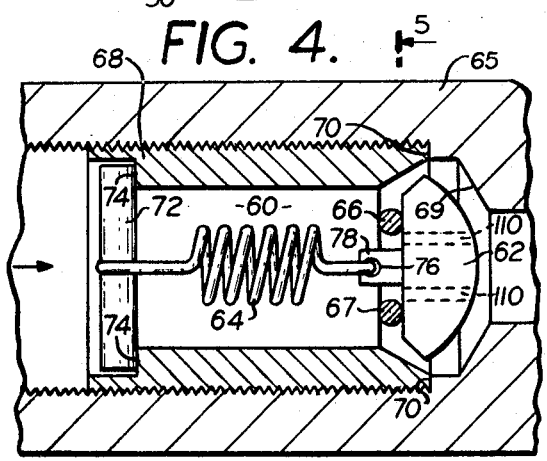
FIG. 4 is a fragmentary sectional view showing a modified form of the construction shown in FIG. 1.
Figure 5:
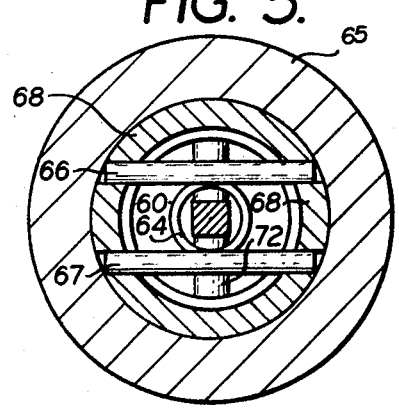
FIG. 5 is a sectional view taken on the line 5—5 of FIG. 4.

When the invention is to be used under conditions which do not subject the fuse to conditions that are likely to cause oscillation of the valve element, the construction shown in FIG. 4 is suitable. This construction is of less longitudinal extent in the pipeline than is the construction shown in FIG. 1.

In FIG. 4 a housing 65 has a frusto-conical valve seat 68 at a downstream end of a valve chamber 60. There is a valve element 62 in the valve chamber movable through a stroke between open and closed positions. A helicaltension spring 64 gives the valve element 62 a bias toward open position; and there are abutment rods 66 and 67 in position to limit the stroke of the valve element 62 in an upstream direction.

The abutment rods 66 and 67 extend through the side wall of a sleeve 68 which screws into the housing 65 and which can be screwed into contact with a shoulder 70. The sleeve 68 holds an upstream rod 72 in notches 74 at the upstream end of the sleeve 68; and the sleeve 68 can be adjusted to move the abutment rods 66 and 67 and the anchor 72 longitudinally in the chamber 60 by screwing the sleeve 68 back and forth along the threads that connect it with the housing 56. Since the abutment rods 66 and 67 and the anchor 72 all move longitudinally by the same distance as the sleeve 68, the length and tension of the spring 64 remains unchanged.

If it is desired to adjust the fluid flow fuse of FIG. 4 so that it will close at a different rate of flow, the sleeve 68 is screwed one way or the other to change the spacing of the abutment rods 66 and 67 from the seat 69 so that the valve element 62 is spaced by a different distance from the valve seat. This changes the pressure drop across the valve element for a given rate of flow and causes the valve element to move into closed position at a different flow rate.

The spring 64 hooks through an opening 76 in an extending portion 78 of the valve element and this connection of the spring to the valve element permits a limited shifting of the valve element 62 around the axis of the transversely extending opening 76 so that the valve element can align itself with its seat 69 when in closed position.

The upstream end of the spring 64 hooks into a groove mid way between the ends of the rod 72, as already described for the spring 32 of FIG. 1.

The face of the valve element 62 which contacts with the seat 69 is convex and is preferably a portion of a sphere having its center at the connection of the spring 64 to the valve element 62.

The valve element 62 is loose in the housing in that it can shift transversely and does not slide in any guides which could be affected by buildup of deposits in the fluid flow passage. The valve element 62 is held in a generally centered position by the pull of the spring 64 which is shaped to exert a pull which is substantially centered in the fluid flow passage. The convex surface of the valve element 62 which contacts with the frusto-conical seat 69 provides continuous contact of the valve element with the seat in spite of variations in the alignment of the valve element with the seat.

Figure 6:
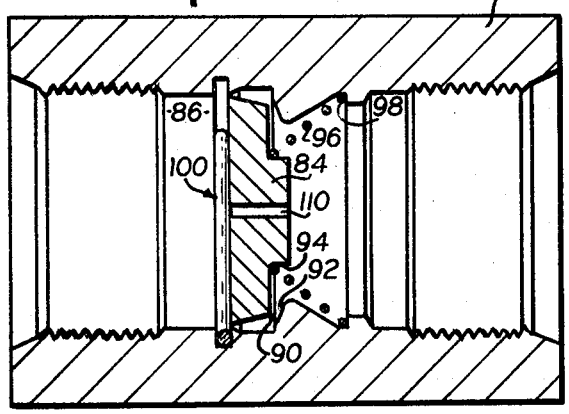
FIG. 6 is a sectional view through a modified form of the invention.

FIG. 6 shows a modified form of the invention in which a valve element 84 is located in a valve chamber 86 in a housing 88. The valve element 84 has a face 90 which moves into and out of contact with a valve seat 92. This valve seat 92 is concave and shaped to maintain substantially continuous contact around the circumference of the face 90 of the valve element 84 when the valve element is moved into closed position in contact with the seat 92.

There is a hub 94 on the downstream side of the valve element 84. This hub is substantially concentric with the rest of the valve element 84. A frusto-conical compression spring 96 has its smaller diameter end fitting around the hub 94 and has its larger diameter end in contact with a shoulder 98 formed in the housing 88 downstream from the valve seat 92. The spring 96 extends through the opening which is surrounded by the valve seat 92 and biases the valve element 84 toward an open position away from the valve seat 92. An abutment 100 limits the upstream movement of the valve element 84 and thus determines the end of the stroke at which the valve element is in its open position.

Figure 7:
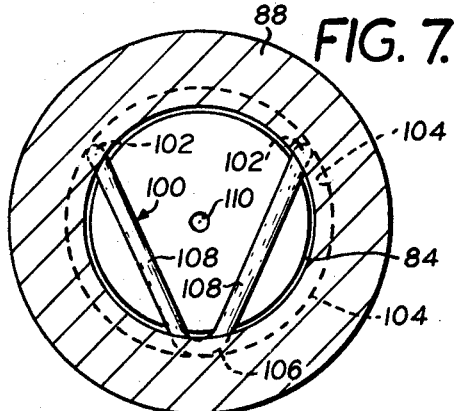
FIG. 7 is a sectional view on the line 7—7 of FIG. 6.

The abutment 100 is best shown in FIG. 7. It consists of a spring having end portions 102 which fit into a circumferential groove 104 in the fluid passage through the housing 88.

The abutment spring 100 is of V-shaped contour and has a mid portion 106 which fits into the groove 104. Since the ends 102 of the spring 100 contact with the groove 104 above the center and at locations where upward movement of the mid portion 106 requires further bending of the spring, the spring abutment 100 is in a stable position in FIG. 7. There are substantially straight portions 108 extending between the mid portion 106 and the ends 102 as chords of the circular cross section of the fluid flow passage and these straight portions 108 are in the path of movement of the valve element 84 and contact with the upstream side of the valve element to limit its stroke.

Fluid flow fuses can be made with valve elements which completely block the flow of fluid when in closed position; but they are commonly made with passages through them of small diameter which permit some leak of fluid when the valve element is closed. With such provision for leakage, the downstream pressure can build up after the burst pipe or hose has been replaced and this permits the fluid flow fuse to move back into open position automatically and does away with the necessity of by-passes or other additional structure for shifting the valve element back to open position after it has operated.

In all of the figures of the drawing, there are one or more passages 110 for equalizing pressure on both sides of the valve element when the flow of fluid on the downstream side has been shut off.

The preferred embodiments of the invention have been illustrated and described, but changes and modifications can be made and some features can be used in different combinations without departing from the invention as defined in the claims.

What is claimed is:

1. A fluid flow fuse for limiting maximum flow of fluid through a pipeline, including a housing for connection in the pipeline, a valve chamber in the housing constituting a passage through which the fluid flows, a valve seat at the downstream end of the chamber, a valve element in the chamber and movable through a stroke toward and from the seat, the valve element being of smaller cross section than that of the space enclosed by any radially confronting surfaces surrounding said valve element throughout the length of said valve element when the valve element is in open position whereby the valve element is free of contact with guiding surfaces extending parallel to the direction of movement of the valve element to and from open position, an abutment in position to contact an end face of the valve element at the end of the stroke of the valve element away from the seat, and spring means generally centered across the chamber and connected at one end to the valve element and at the other end with an anchor for holding the valve element in contact with the abutment, said spring holding the valve element, when open, generally centered in the cross section of the chamber and out of surfacecontact with any bearing or guide surface that extends in a direction parallel to the direction of movement of the valve element to and from open position, the spring being strong enough to hold the valve in continuous contact with the abutment during operation of the fuse at intended rates of flow.

2. The fluid flow fuse described in claim 1 characterized by a sleeve in the housing constituting a wall of the passage for a substantial part of the length of the housing, a shoulder in the housing adjacent to the upstream limit of the stroke of the valve element, notches at spaced locations in the downstream end of the sleeve, two rods having their ends held in the notches, each of the rods extending across the passage through the sleeve and substantially to the inside wall of the housing and being held in the notches by the shoulder, the rods being on opposite sides of the center line of the passage and constituting the abutment for limiting the stroke of the valve element away from the seat, an upstream rod at the end of the sleeve remote from the valve element, the spring means including a helical tension spring connected at one end to the valve element and connected at its other end to the upstream rod, said upstream rod extending across the center portion of the passage adjacent to the upstream end of the sleeve, notches in the upstream end of the sleeve at opposite sides of the passage and into which the upstream rod extends and by which the upstream rod is held in spaced relation to the abutments and by which the spring is held under tension and a snap ring in a groove in the housing holding the sleeve in the housing and against the rods and holding the rods against the shoulder.

3. The fluid flow fuse described in claim 1 characterized by the valve element having an extending portion that projects into a part of the fluid passage downstream from the valve seat when the valve element is still in open position for exerting a dash pot action to damp vibrations of the valve element toward and from the seat.

4. The fluid flow fuse described in claim 1 characterized by the valve seat being a frusto-conical surface and the valve element having a seat-contacting surface that is substantially a portion of a sphere for seating against the tapered seat without requiring alignment of the valve element with the axis of the seat.

5. The fluid flow fuse described in claim 4 characterized by the abutment including spaced rods extending across the fluid flow passage at locations spaced from the sides of the passage whereby fluid flows on both sides of each rod, the downstream sides of the rods having substantially line contact with the valve element when the valve element is held against said rods by the tension of the spring, the valve element having a center portion that extends between an upstream end of the rods, the spring being connected with the center portion of the valve element upstream of the rods by a connection on which the valve element has limited rotary movement about an axis extending transversely of the passage, and the center of curvature of the spherical portion of the valve element being substantially on the axis of rotary movement of the connection of the spring to the valve element.

6. The fluid flow fuse described in claim 1 characterized by the valve element having a center hub portion on the downstream side thereof, a shoulder in the housing downstream of the valve seat, a frusto-conical compression spring compressed between the shoulder and the valve element, the spring having its larger diameter end against the shoulder and its smaller diameter end against the valve element, the smaller diameter of the spring surrounding the hub portion of the valve element and holding the valve element in a generally centered position.

7. The fluid flow fuse described in claim 6 characterized by the valve chamber having a circumferential groove in its inside surface adjacent to the upstream side of the valve element when the valve element is in open position, the abutment for the valve element being a spring that snaps into a circumferential groove in the wall of the fluid flow passage, part of the abutment spring extending from the groove into the path of the valve element for limiting the stroke of the valve element.

8. The fluid flow fuse described in claim 7 characterized by the spring that snaps into the circumferential groove having portions that engage the groove and having substantially straight parts between said portions, the straight parts extending across the passage as chords.

9. The fluid flow fuse described in claim 1 characterized by means for adjusting the abutment longitudinally of the chamber to change the spacing of the valve element away from the seat when the valve element is in its open position.

10. The fluid flow fuse described in claim 9 characterized by common supporting means connected with both the abutment and said anchor, said supporting means constituting the means for adjusting the abutment to change the spacing of the valve element away from the seat, and the anchor being movable as a unit with the abutment whereby the length of the spring means remains the same when the abutment is adjusted to change its spacing from the valve seat.

11. A fluid flow fuse for limiting maximum flow of fluid through a pipeline, including a housing for connection in the pipeline, a valve chamber in the housing constituting a passage through which the fluid flows, a valve seat at the downstream end of the chamber, a valve element in the chamber and movable through a stroke toward and from the seat, the valve element being of smaller cross section than the part of the passage in which the valve element moves, an abutment limiting the stroke of the valve element away from the seat, and spring means generally centered across the chamber and connected at one end to the valve element and at the other end with an anchor for urging the valve element toward the abutment and for holding the valve element generally centered in the cross section of the chamber, and characterized by the spring means being a tension spring that extends upstream from the abutment, said abutment including two spaced elements, one on each side of the center line of the fluid passage and in such position that the valve element is held generally centered and against the spaced abutment elements by the tension of the spring.

12. The fluid flow fuse described in claim 11 characterized by the spaced elements being rods extending across the fluid flow passage at locations spaced from the sides of the passage whereby fluid flows on both sides of each rod, the downstream sides of the rods having substantially line contact with the valve element when the valve element is held against said rods by the spring.

* * * * *